US012621518B2

(12) United States Patent
Armitage et al.

(10) Patent No.: US 12,621,518 B2
(45) Date of Patent: May 5, 2026

(54) VIDEO CONTENT ENHANCEMENT

(71) Applicant: CAPTIONHUB LTD, London (GB)

(72) Inventors: Thomas William Richard Armitage, London (GB); Thomas Charles Bridges, London (GB); Tijmen Pieter Brommet, London (GB); Alexander Edmund Hardman, London (GB); Andrew Campbell McDonough, London (GB); Daniel Thomas Nuttall, London (GB); Erik Ingemar Nygren, London (GB)

(73) Assignee: CAPTIONHUB LTD (GB)

( * ) Notice: Subject to any disclaimer, the term of this patent is extended or adjusted under 35 U.S.C. 154(b) by 0 days.

(21) Appl. No.: 18/602,197

(22) Filed: Mar. 12, 2024

(65) Prior Publication Data

US 2024/0305857 A1     Sep. 12, 2024

(30) Foreign Application Priority Data

Mar. 12, 2023     (GB) ...................................... 2303606

(51) Int. Cl.
H04N 21/431          (2011.01)
H04N 21/488          (2011.01)

(52) U.S. Cl.
CPC ..... H04N 21/4318 (2013.01); H04N 21/4312 (2013.01); H04N 21/4884 (2013.01)

(58) Field of Classification Search
CPC ........... H04N 21/4318; H04N 21/4312; H04N 21/4884
See application file for complete search history.

(56) References Cited

U.S. PATENT DOCUMENTS

| | | | | |
|---|---|---|---|---|
| 9,456,170 | B1* | 9/2016 | Miller | .................... G11B 27/10 |
| 10,917,607 | B1* | 2/2021 | Cheung | ............... H04N 5/9305 |
| 2007/0011012 | A1 | 1/2007 | Yurick et al. | |
| 2015/0341694 | A1* | 11/2015 | Hanko | ............... H04N 21/4884 |
| | | | | 725/32 |
| 2020/0211565 | A1 | 7/2020 | Dubinsky et al. | |
| 2020/0404386 | A1* | 12/2020 | Mccartney, Jr. | ........ G06F 40/58 |
| 2022/0358905 | A1* | 11/2022 | Gupta | .................... G06F 40/42 |

FOREIGN PATENT DOCUMENTS

CN              113343675  A      9/2021

* cited by examiner

*Primary Examiner* — Mulugeta Mengesha
(74) *Attorney, Agent, or Firm* — Endurance Law Group PLC; James R. Yee

(57) ABSTRACT

Video content enhancement methods, systems and devices are disclosed. An input video 11 is processed to generate an augmentation descriptor 4 from it, the augmentation descriptor 4 defining augmentations that enhance the content of the input video 11. An output video 14 is generated by combining the augmentations defined by the augmentation descriptor 4 with the input video 11, so that playback of the output video 14 features said augmentations. A timecoded transcript is generated from at least an audio portion of the input video 11, and the timecoded transcript is processed to generate from it a set of transcript-derived enhancements. The set of transcript-derived enhancements are added to the augmentation descriptor 4 as augmentations for enhancing the content of the input video 11.

18 Claims, 2 Drawing Sheets

Figure 1:
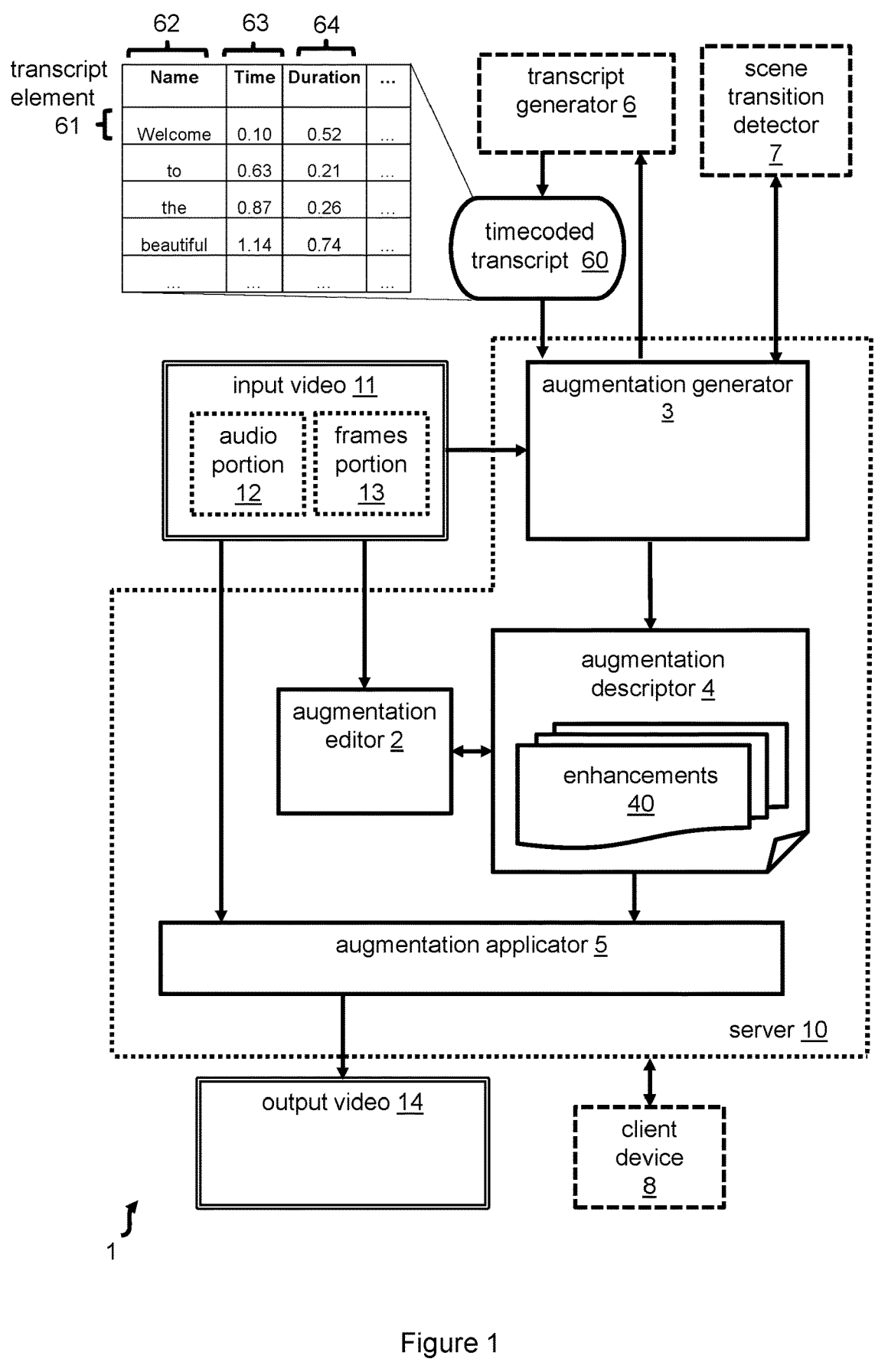

| | 62 | 63 | 64 | |
|---|---|---|---|---|
| transcript element 61 | Name | Time | Duration | ... |
| | Welcome | 0.10 | 0.52 | ... |
| | to | 0.63 | 0.21 | ... |
| | the | 0.87 | 0.26 | ... |
| | beautiful | 1.14 | 0.74 | ... |
| | ... | ... | ... | ... | transcript generator 6 scene transition detector 7 timecoded transcript 60 input video 11 audio portion 12 frames portion 13 augmentation generator 3 augmentation editor 2 augmentation descriptor 4 enhancements 40 augmentation applicator 5 server 10 output video 14 client device 8

VIDEO CONTENT ENHANCEMENT

CROSS REFERENCE TO RELATED APPLICATIONS

This application claims priority to UK Patent Application GB 2303606.4 filed on Mar. 12, 2023, the entire disclosure of which is hereby incorporated by reference and relied upon.

BACKGROUND OF THE INVENTION

Field of the Invention

The present invention relates to systems and methods for video content enhancement. In particular, the invention relates to providing video content with enhancements, such as captions, that can be presented in addition to original video content.

The accessibility of video content can be improved by adding augmentations or enhancements to it, such as captions.

Captions provide a synchronised text transcription of audio such as speech, providing an audience of the video content another way of accessing important components of that video content. This improves the intelligibility of content, especially for audiences that have hearing impairments. Furthermore, captions that are in the form of subtitles can allow audiences to understand audio dialogue delivered in a different language.

Such enhancements can be added in "post-production" to an otherwise already-completed video because the enhancements concern transforming content that already exists from the video itself, or otherwise is derivable from it.

This normally requires user input to add the enhancements in a way that promotes their accuracy and accessibility. For example, captions may be typed out, or even delivered via respeaking speech, with the appropriate punctuation, emphasis and formatting added to promote comprehension. This is labour-intensive, and often requires special training to ensure reliable output, especially when delivering a just-in-time captioning service for live broadcasts.

Whilst services such as speech-to-text voice recognition can provide a basic way of automating aspects of video content enhancement, the quality of output tends to be unsuitable for most use-cases.

An improvement is therefore required in the automation of video content enhancement, and additionally in support of user-controlled video content enhancement.

It is against this background that the present invention has been conceived.

BRIEF SUMMARY OF THE INVENTION

According to a first aspect of the present invention there is provided a system for video content enhancement, the system comprising:

an augmentation generator configured to receive and process an input video to generate an augmentation descriptor from it, the augmentation descriptor defining augmentations that enhance the content of the input video; and an augmentation applicator configured to generate an output video by combining the augmentations defined by the augmentation descriptor with the input video, so that playback of the output video features said augmentations.

Preferably, the augmentations defined by the augmentation descriptor comprise transcript-derived enhancements.

Preferably, the augmentation generator is configured to:

transmit at least an audio portion of the input video to a transcript generator and receive in response from the transcript generator a time-coded transcript;

process the time-coded transcript to generate from it a set of transcript-derived enhancements; and add the set of transcript-derived enhancements to the augmentation descriptor as augmentations for enhancing the content of the input video.

Preferably, each of the set of transcript-derived enhancements define:

an in-point, corresponding to a timecode when the enhancement is to be introduced during playback of the output video;

an out-point, corresponding to a timecode when the enhancement is to be removed during playback of the output video.

Preferably, the set of transcript-derived enhancements comprises a block of text derived from elements of the time-coded transcript, a period of featuring augmentations derived from the block of text being defined by the in-point and the out-point of the respective enhancement.

Preferably, the set of transcript-derived enhancements comprises a plurality of sequential caption-type enhancements, each caption-type enhancement comprising a block of text derived from elements of the time-coded transcript, a period of display of the block of text being defined by the in-point and the out-point of the respective caption-type enhancement.

Preferably, the system may comprise, or is in communication with a transcript generator. The transcript generator may be configured to receive and process an audio portion of the input video to transcribe from it a timecoded transcript.

The timecoded transcript may comprise a plurality of transcript elements, each of which comprises a set of values for a respective predetermined set of attributes. The predetermined set of attributes may comprise:

a name attribute for identifying an individual word of speech determined to be spoken within the audio portion of the input video;

at least one temporal attribute for specifying a timing of the individual word of speech identified by the name attribute.

Preferably, the at least one temporal attribute comprises:

a time attribute for specifying a time at which the individual word of speech identified by the name attribute was spoken relative to a common time reference, such as a start time of the input video; and a duration attribute for specifying a duration for which the individual word of speech denoted by the name attribute was spoken.

The name attribute may further identify a component of punctuation.

The transcript generator may be configured to receive and process a frames portion of the input video to determine lip movements of speakers. Preferably, the determined lip movements may be used to improve the accuracy of a speech-to-text transcription from the audio portion of the input video.

Preferably, the system comprises a translation engine configured to generate a translation from a source language to a user-selected output language of at least one of:

the timecoded transcript; and blocks of text of each transcript-derived enhancement.

Preferably, the transcript generator may be configured to translate from a source language detected in the audio portion of the input video to a user-selected output language.

Preferably, the timecoded transcript comprises a plurality of transcript elements, each of which comprises a set of values for a respective predetermined set of attributes. Preferably, the predetermined set of attributes comprising:

a name attribute for identifying an individual word of speech determined to be spoken within the audio portion of the input video; and at least one temporal attribute for specifying a timing of the individual word of speech identified by the name attribute.

Preferably, processing of the timecoded transcript to generate from it each transcript-derived enhancements comprises at least one of:

applying a grouping process to assign a group of sequential transcript elements to each transcript-derived enhancement;

generating the block of text of each transcript-derived enhancement by combining the values of the name attribute of each transcript element belonging to the group assigned to that transcript-derived enhancement; and applying a timing optimisation process to determine the in-point and out-point of each transcript-derived enhancement.

Preferably, applying the grouping process comprises at least one of:

assigning a first transcript element of the timecoded transcript to a first group;

assigning subsequent transcript elements to the same group as a previous transcript element if a size of the group to which a previous transcript element is assigned does not exceed a predetermined group size threshold;

assigning subsequent transcript elements to subsequent groups if:

a time gap between subsequent and previous transcript elements, as calculated from the values of their respective temporal attributes, exceed a predetermined time gap threshold;

the value of the name attribute of the subsequent transcript element includes a predetermined word (such as a conjunction like "and"); and/or the value of the name attribute of the previous transcript element includes a predetermined punctuation character, such as a full-stop.

Preferably, the caption-type enhancement comprises line break data for specifying if and where a line breaks occurs within the block of text when displayed. Preferably, the augmentation generator is configured to generate the line break data so that the position of a line break within the block of text:

occurs if the characters of the block of text exceed a predetermined length;

occurs prior to a predetermined word in the block of text (such as a conjunction like "and"); and/or does not occur prior to a final word in the block of text.

Preferably, the caption-type enhancement comprises text positioning data for specifying the position of the block of text, when displayed during playback of the output video. Ideally, the augmentation generator is configured to generate the text positioning data so that the block of data is positioned, by default, at a lower central region of the output video.

Preferably, the augmentation generator further comprises a text position optimisation module configured to:

analyse a frames portion of the input video to recognise a predetermined set of visual entities and their screen occupancy over time;

process caption-type enhancements to make a position determination about where the associated block of text of the caption-type enhancement is positioned relative to the recognised set of visual entities during the period defined by the in-point and out-point of that caption-type enhancement; and set the text positioning data of that caption-type enhancement in response to the position determination.

Specifically, the text position optimisation module is configured to:

process caption-type enhancements to make a coincidence determination about whether, during the period defined by the in-point and out-point of that caption-type enhancement, display of the associated block of text of the caption-type enhancement coincides with at least one of the recognised visual entities; and set the text positioning data of that caption-type enhancement in response to the coincidence determination.

Preferably, setting the text positioning data of that caption-type enhancement in response to the coincidence determination minimises occlusion of the recognised visual entity by the block of text of that caption-type enhancement.

Preferably, each predetermined set of visual entities have a predetermined visibility score that defines the importance of the non-occlusion of that visual entity by blocks of text; and setting the text positioning data priorities non-occlusion of visual entities with a higher visibility score.

Preferably, the set of predetermined visual entities comprise a plurality of speakers. Preferably, the augmentation generator is configured to:

determine which block of text originates from which of the plurality of speakers;

set the text positioning data of a block of text so that it is displayed at a position closer to the speaker from which that block of text originates, than the other of the plurality of speakers.

Preferably, the caption-type enhancement comprises text formatting data for specifying the formatting of the block of text, when displayed during playback of the output video;

the augmentation generator being configured to set the text formatting data in dependence on the detected visual properties of the input video.

For example, the augmentation generator may be configured to set the text formatting data in dependence on a frame resolution of the input video. The font size of the block of text may therefore be controlled in response to the resolution of the input video.

Preferably, the predetermined set of attributes of transcript elements of the timecoded transcript comprise a speaker attribute for identifying the speaker of an individual word of speech determined to be spoken within the audio portion of the input video; and the augmentation generator is configured to set the text formatting data of a block of text in dependence on which speaker originated that block of text, so that block of texts originating from difference speakers are visually distinguishable from one another.

Preferably, applying the grouping process comprises assigning transcript elements to different groups if the value of the speaker attribute is different.

Preferably, applying the timing optimisation process comprises at least one of:

deriving the in-point and/or out-point of each transcript-derived enhancement from values of temporal attributes of transcript elements belonging to the group assigned to that transcript-derived enhancement;

deriving the in-point of each transcript-derived enhancement from the value of at least one temporal attribute of a first of the group of transcript elements assigned to that transcript-derived enhancement;

setting the in-point of each transcript-derived enhancement to immediately follow the out-point of a previous transcript-derived enhancement;

deriving the out-point of each transcript-derived enhancement from the value of at least one temporal attribute of a last of the group of transcript elements assigned to that transcript-derived enhancement; and deriving at least one of the in-point and out-point of each transcript-derived enhancement in response to determining an optimal and/or a minimum featuring duration for that transcript-derived enhancement. A featuring duration may comprise a display duration.

Preferably, determining the optimal and/or minimum featuring duration comprises at least one of:

setting a predetermined upper and/or lower featuring duration threshold;

setting the optimal and/or minimum featuring duration to be proportional to at least one of:

a determined size of the group of transcript elements assigned to that transcript-derived enhancement; and a determined word, syllable and/or character length of the block of text of that transcript-derived enhancement.

Preferably, the system comprises a scene transition detector configured to process the input video to determine at least one scene transition timecode, corresponding to when there is a scene change.

Preferably, the scene transition detector performs a frame comparison operation to determine the at least one scene transition timecode.

Preferably, the frame comparison operation comprises computing the difference between visual properties of consecutive frames, and determining a scene transition when the visual properties change above a predetermined limit. Preferably, the visual properties include colour distribution.

Preferably, applying the timing optimisation process comprises:

determining if the out-point derived from the value of at least one temporal attribute of the last of the group of transcript elements assigned to a respective transcript-derived enhancement corresponds to a timecode optionally prior to and within a predetermined threshold of one of the at least one scene transition timecodes, and if so changing the out-point of the transcript-derived enhancement to be equivalent to that scene transition timecode.

Preferably, the system further comprises an augmentation editor configured to edit the augmentation descriptor. Preferably, the augmentation editor comprises a user interface to:

receive user input to edit the augmentation descriptor; and display information contained within the augmentation descriptor.

For example, the augmentation editor can be configured to present a user interface that displays, and/or receives user input to control:

grouping parameters such as the predetermined group size threshold, and the predetermined time gap threshold; and/or line break parameter, such as the predetermined length of a block of text.

Preferably, the augmentation editor is configured to receive a user command to operate the augmentation generator so that the augmentation generator processes the input video to generate from it the augmentation descriptor.

Preferably, the augmentation editor is configured to present a timeline representative of the input video, and/or present an output video preview.

Preferably, the augmentation editor is configured to interface with the scene transition detector to obtain the at least one scene transition timecode, and display a transition marker of the scene transition at a position on the timeline corresponding to the respective timecode.

Preferably, the augmentation editor is configured to read the augmentation descriptor and, in response, display at least one enhancement element representative of a respective transcript-derived enhancements from the augmentation descriptor. Preferably, the at least one enhancement element is positioned along the timeline at a position corresponding to the in-points and/or out-points of the respective transcript-derived enhancement.

Preferably, each enhancement element occupies a space on the timeline corresponding to a duration defined by the in-point and out-point of the respective transcript-derived enhancement.

Preferably, each enhancement element is user-interactable to support at least one user interaction that updates the corresponding transcript-derived enhancement thereby updating the augmentation descriptor.

Preferably, the at least one user interaction is:

a movement interaction;

a resizing interaction;

a splitting interaction;

an interconnection interaction; and/or a content-editing interaction.

Preferably, the movement interaction moves the enhancement element along the timeline and, in response, updates the in-point and the out-point of the transcript-derived enhancements represented by the enhancement element, but preserving the duration of the period represented by the in-point and out-point.

Preferably, each enhancement element occupies a space on the timeline delimited by a starting end and a finishing end that are respectfully representative of the in-point and out-point of the respective transcript-derived enhancement.

Preferably, the resizing interaction shifts either the starting or finishing end of the enhancement element along the timeline and, in response, updates either of the corresponding in-point or the out-point of the transcript-derived enhancements represented by the enhancement element, so as to alter the time period represented by the in-point and out-point.

Preferably, the splitting interaction splits the enhancement element into two separate enhancement elements, each representing one of two transcript-derived enhancements that contain a respective portion of the block of text of the transcript-derived enhancement originally represented by the enhancement element before the split.

Preferably, the augmentation editor is configured to automatically update the position of one or more enhancement elements that are adjacent to an enhancement element that is receiving a movement or resizing interaction from a user to:

preserve the ordering the enhancement elements;

prevent timeline overlap of those one or more adjacent enhancement elements; and/or preserve the size of those one or more adjacent enhancement elements, and so the duration of the associated one or more transcript-derived enhancements.

Preferably, the interconnection interaction when user-selected:

resizes the enhancement element by placing its finishing end to the starting end of a subsequent enhancement element along the timeline; and updates the out-point of the transcript-derived enhancement represented by the enhancement element to be substantially equivalent to the value of the in-point of the transcript-derived enhancement represented by the subsequent enhancement element.

Preferably, the interconnection interaction comprises a coupling command that maintains a connection between the enhancement element and the subsequent enhancement element so that they are moveable as one unit.

Preferably, the interconnection interaction comprises a decoupling command which breaks the connection between the enhancement element and the subsequent enhancement element so that they are moveable individually.

Preferably, each enhancement element displays text corresponding to the block of text of the transcript-derived enhancement that it represents.

Preferably, the content-editing interaction updates at least one of:

the content of the block of text;

line break data; and text positioning data;

of the transcript-derived enhancement that the enhancement element represents.

Preferably, the augmentation editor is configured to issue an indication if it is determined that properties of a transcript-derived enhancement exceed predetermined constraint parameters, the indication being associated with an enhancement element representing the transcript-derived enhancement.

Preferably, the constraint parameters comprise at least one of:

the number of characters in a block of text; and the duration of the transcript-derived enhancement, as defined by its in-point and out-point.

Preferably, the indication comprises setting indicia, such as colour, to distinguish from a default indicia. Preferably, the indicia that distinguishes from a default indicia is set in dependence on the extent to which the predetermined constraints parameters are exceeded.

Preferably, the set of transcript-derived enhancements comprises a voice-over-type enhancement that includes a block of text to be transcoded into speech, the augmentation applicator being configured to generate speech audio from the block of text of the voice-over-type enhancement.

Preferably, a prosody rate of the generated speech audio is controlled by the augmentation applicator so that the timing and duration of the speech audio substantially conforms with the in-point and out-point of the voice-over-type enhancement.

Preferably, the audio properties of the generated speech audio is controlled by the augmentation applicator to be similar to the audio properties of a speaker detected from the audio portion of the input video, the speaker originating the block of text of the voice-over-type enhancement. For example, the generated speech audio is ideally pitch-shifted to have a similar vocal range to that of the original speaker within the input video.

Preferably, the voice-over-type enhancement comprises video alteration instructions for altering the output video in dependence on the block of text to be transcoded into speech.

Preferably, the video alteration instructions comprise lip-movement alteration to be made to the input video so that movement of the lips of a speaker within the output video appear to match with the speech audio generated from the block of text of the voice-over-type enhancement. The system may thus comprises a voice-over-type enhancement generator that is configured to process the input video to generate voice-over-type enhancements having video alteration instructions.

Preferably, the system is configured for just-in-time video content enhancement wherein the input video is in the form of an input video stream, and the output video is in the form of an output video stream that is transmitted a time delay after the availability of the input video stream.

Preferably, the augmentation generator is configured to generate a corresponding stream of augmentation descriptors that include synchronisation data. Preferably, the augmentation applicator is configured to receive the stream of augmentation descriptors and synchronise them, using the synchronisation data, with the output video stream.

Further aspects of the invention may provide a method of video content enhancement for example using the system according to the first aspect, or the components and/or functions thereof.

In particular, a second aspect of the present invention may provide a method of video content enhancement, the method comprising:

processing an input video to generate an augmentation descriptor from it, the augmentation descriptor defining augmentations that enhance the content of the input video; and generating an output video by combining the augmentations defined by the augmentation descriptor with the input video, so that playback of the output video features said augmentations;

wherein the processing of the input video comprises:

deriving a timecoded transcript from at least an audio portion of the input video;

processing the timecoded transcript to generate from it a set of transcript-derived enhancements that define an in-point, corresponding to a timecode when the enhancement is to be introduced during playback of the output video, and an out-point, corresponding to a timecode when the enhancement is to be removed during playback of the output video; and adding the set of transcript-derived enhancements to the augmentation descriptor as augmentations for enhancing the content of the input video.

It will be understood that features and advantages of different aspects of the present invention may be combined or substituted with one another where context allows.

Furthermore, such features may themselves constitute further aspects of the present invention. For example, the features of the system, such as the augmentation generator, and the augmentation editor may themselves constitute further aspects of the present invention.

Additionally, aspects relating to video content enhancement methods may further include steps or processes carried out by components of the system. Conversely, aspects relating to the system of the first aspect of the invention, or components thereof, may implement steps associated with video content enhancement methods according to the invention.

BRIEF DESCRIPTION OF THE SEVERAL VIEWS OF THE DRAWINGS

In order for the invention to be more readily understood, embodiments of the invention will now be described, by way of example only, with reference to the accompanying drawings in which:

FIG. 1 is a schematic diagram of a system according to various embodiments of the present invention.

DETAILED DESCRIPTION OF THE INVENTION

Figure 2:
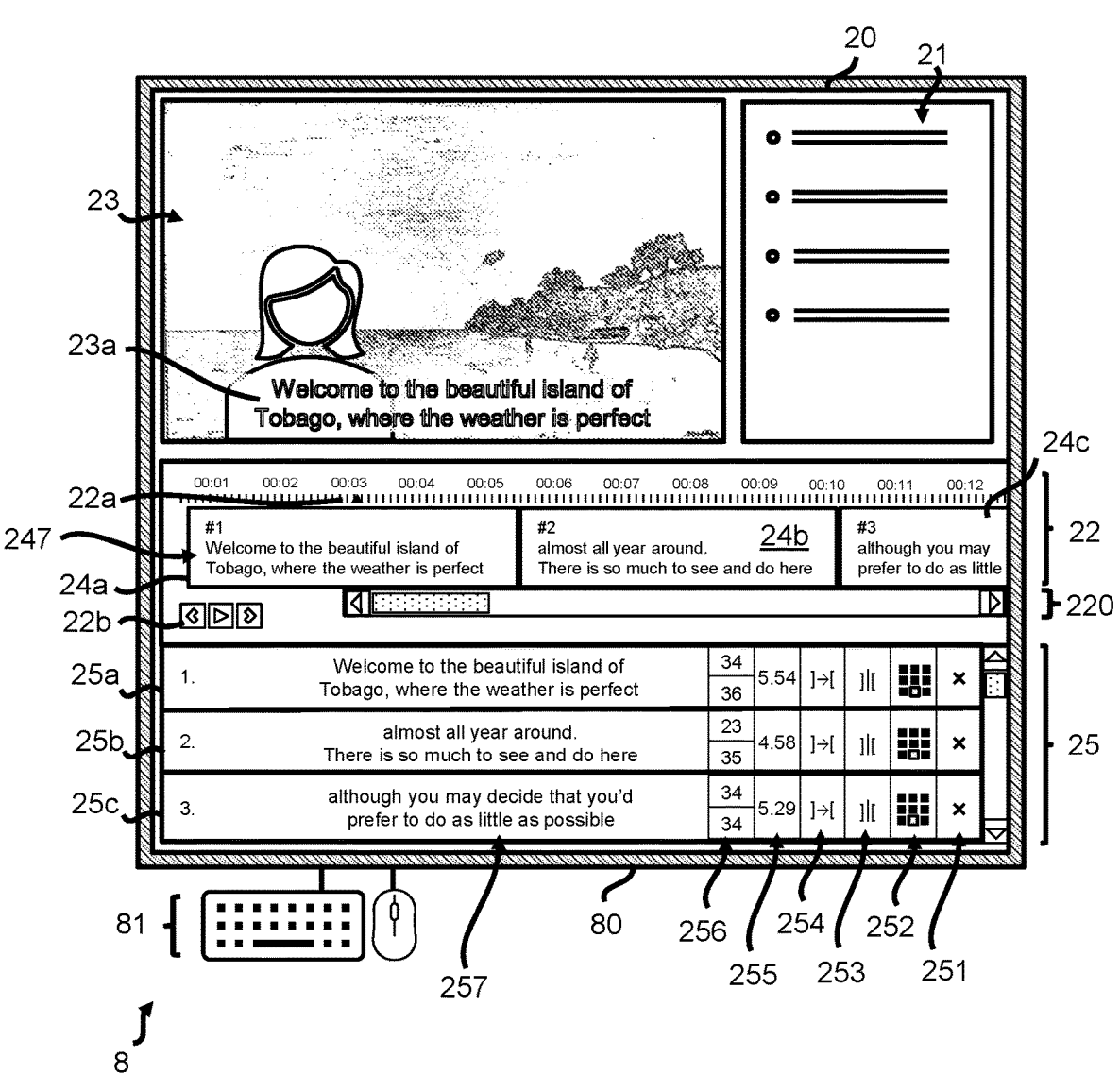
FIG. 2 is a schematic drawing of a user device that implements an augmentation editor of the system of FIG. 1.

FIG. 1 is a schematic diagram of a video content enhancement system 1 according to various embodiments of the present invention. The system 1 is configured to allow enhancements, such as captions, to be added to an input video 11, resulting in an output video 14 that feature those enhancements.

The system 1 comprises an augmentation editor 2, an augmentation generator 3, and an augmentation applicator 5. These are implemented on a system server 10.

It should be noted that every component shown in and described with reference to FIG. 1 is not necessarily an essential part of embodiments of the invention-they are merely included for completeness. Notably, some of the components may be simply used by or interact with the system 1 rather than necessarily being integral parts of the system 1 itself.

For example, a transcript generator 6, a scene transition detector 7, and a client device 8, shown in dotted outline in FIG. 1, are typically components that interact with the system 1. Nonetheless, other embodiments of the invention the system may include at least one of these components.

Furthermore, whilst the communication interconnections between various components of or interacting with the system 1 are shown as connecting lines, these are not exclusive. Each component may, in certain embodiments, communicatively connect with all others.

In various embodiments the communication interconnections may be embodied by a wired and/or wireless local area network (LAN), peer-to-peer wireless connections (e.g. using at least one of Bluetooth and direct Wi-Fi), a wide area network (WAN) such as the Internet, or a combination of these. Moreover, certain components shown in FIG. 1 may reside on a single device and so, in this case, the communication interconnections may include intra-device communication channels.

Leading on from this, certain components shown in FIG. 1 may be provided as part of or otherwise integrated with others. Moreover, components may not necessarily be in the form of a single physical machine or device. For example, the term "server" may encompass, for example, a distributed or "cloud" computing service, engine, service or platform.

In general, the client device 8 allows an end user to access the components and functionality of the server 10. This may be provided via a dedicated application downloaded from the server 10 or another application hosting platform. Alternatively, the client device 8 can access and control the server 10 via a web browser or similar.

The client device 8 issues instructions to the server 10 and its components to specify an input video 11 and processing preferences. The server 10 can be directed to generated enhancements and combined with the input video 11 to generate an output video 14 that feature those enhancements.

Specifically, the augmentation generator 3 of the server 10 is configured to receive and process the input video 11 to automatically generate an augmentation descriptor 4 from it. The input video 11 has an audio portion 12 and a sequence of image frames portion 13, and these are extracted for use by the augmentation generator 3.

The augmentation generator 3 transmits a transcript request to the transcript generator 6 and receives a timecoded transcript 60 in response. The transcript request includes the audio portion 12 of the input video 11, or otherwise access, by the transcript generator, to the audio portion 12 of the input video 11 via a resource link. The transcript generator 6 utilise a speech-to-text engine that processes the audio portion 12 of the input video 11 and generates a timecoded transcript 60 from it.

The timecoded transcript 60 is typically in the form of a structured data file in XML format. However, for simplicity, the transcript is represented in FIG. 1 as a table. The transcript 60 comprises a plurality of transcript elements 61, each represented in FIG. 1 as row of the table. The transcript elements 61 are each generally representative of elements of speech detected by the transcript generator 6 from the audio portion 12 of the input video 11. Each transcript element 61 comprises a set of values for the corresponding set of attributes.

Each column of the table represents each one of these sets of attributes. A name attribute 62 identifies an individual word of speech determined to be spoken within the audio portion 12 of the input video 11. Temporal attributes, such as a time attribute 63 and a duration attribute 64, specify a timing of the individual word of speech identified by the name attribute 62. Specifically, the time attribute 63 specifies a time at which the transcript generator 6 determined that an individual word of speech, identified by the name attribute, was spoken relative to a common time reference, such as a start time of the input video 11. The duration attribute 64 specifies a duration for which the individual word of speech denoted by the name attribute was spoken.

In alternatives, different way of denoting temporal attributes may be used to achieve a similar effect. For example, a start time and an end time for each word may be used instead.

Punctuation may also be denoted under the name attribute—the transcript generator 6 determining appropriate punctuation in dependence on, for example, detected pauses or emphasis added by speakers.

In certain embodiments of the invention, the augmentation generator may also pass the frames portion 13 of the input video 11 to the transcript generator 6. The transcript generator 6 is then configured to receive and process the frames portion 13 of the input video 11 to increase the accuracy of the speech-to-text transcription. This is done by determining visual cues that increase the probability of the correct word being transcribed. For example, the transcript generator 6 is configured to analyse the frame portion 13 of the input video 11 to detect image sequences that appear to show people speaking. The lip movement of those speakers are compared with candidate words proposed by the speech-to-text engine, and the most likely candidate is chosen.

In certain embodiments, analysis of the frames portion 13 is concentrated on periods of the input video 11 that speech is detected in the audio portion 12. Advantageously, this minimises unnecessary processing, and so increases the speed and accuracy of transcript generation. In further alternatives, analysis of the frames portion 13 is concentrated on periods where a confidence score for a correct word transcription is below a threshold amount.

In certain embodiments, the transcript generator 6 can populate transcript elements 61 with other attributes. For example, an attribute may be a speaker identification attribute. The transcript generator 6 may process the audio portion 12 of an input video 11 to identify a speaker of each word. Words in the transcript 60, spoken by different speakers, can therefore be attributed to differentiated speakers. This is generally achieved by detecting and differentiating between audio properties, such as the pitch and timbre of each speaker. Speakers can be identified in a generic way (e.g., setting the value of the speaker identification attribute as: speaker 1, speaker 2, etc.), or via audio properties (e.g., tenor, alto), or by name if name information is available from the input video 11. For example, the input video may feature a speaker that introduces themselves, and so this can be used to assign the value of the corresponding speaker identification attribute.

The timecoded transcript 60 is received and processed by the augmentation generator 3 to generate augmentations from it, including a set of transcript-derived enhancements 40. These transcript-derived enhancements 40 are included in the augmentation descriptor 4 as instructions for enhancing the content of the input video 11. An example of one type of enhancement is a caption-type enhancement, that provides instructions to add captions to enhance the content of the input video 11.

The transcript-derived enhancements 40 each define an in-point, an out-point, and a block of text. The in-point of a transcript-derived enhancements 40 corresponds to a timecode when the enhancement is to be introduced during playback of the output video. The out-point of a transcript-derived enhancements 40 corresponds to a timecode when the enhancement is to be removed during playback of the output video 14. It should be noted that, in alternatives, in-points and out-points may be substituted by other suitable timing conventions.

For each caption-type enhancement, the block of text corresponds to the caption to be displayed, and a period of display of that block of text is specified by the in-point and the out-point.

The term caption herein generally refers to text displayed during video playback, to match the speech of a speaker. The text usually is distributed across one or two lines. Captions are either in the same language as the source speech audio, or may be translations into another language, in which case captions are generally referred to as subtitles.

To this end, the system further comprises a translation engine configured to generate a translation from a source language to a user-selected output language. The translation engine may be part of the transcript generator 6, in which case the timecoded transcript 60 contain text in the user-selected output language. However, it is preferred for the translation engine to be in communication with, or part of the augmentation generator 3, translation to be applied to text of each transcript-derived enhancement 40.

Other enhancement types provide instructions for other types of augmentation, derived from the block of text, that can be used to enhance the content of the input video 11. For example, the set of transcript-derived enhancements 40 can, in certain embodiments, comprise voice-over-type enhancements. In this case, the block of text specifies words that are to be transcoded into synthetic voice-over speech, and the in-point and out-point provide instructions to control the timing and duration of that voice-over speech.

The augmentation descriptor 4 is typically in the form of a structured data file and may contain multiple sets of transcript-derived enhancements 40. In alternatives, the augmentation descriptor 4 may be split across multiple files.

The augmentation descriptor 4 is received by the augmentation applicator 5 which is configured to generate an output video 14 by combining the augmentations defined by the augmentation descriptor 4 with the input video 11, so that the output video 14 features said augmentations during playback.

In certain implementations, the augmentation applicator 5 is separate from the server 10, for example located at a client device 8. In this case, the input video 11 and the augmentation descriptor 4 are sent as a package to the client device 8 which is configured to combine them to feature the augmentations. This is particularly the case when the augmentations are in the form of closed captions. Closed captions can be enabled or disabled during video playback under the control of a viewer of the video.

This demands that the client device 8, used for playback of the output video, has the technical capability to combine the input video and the augmentations described by the augmentation descriptor 4. Some devices do not have this capability and so, for this reason and others, it can be desirable instead to permanently feature the augmentations. An example of this is "open" or "burned-in" captions. In this case, the augmentation applicator 5 resides on the server 10 and is configured to send the output video 14 to a client device 8 after rendering the captions defined by caption-type enhancements specified in the augmentation descriptor 4.

Naturally, this extends to other type of augmentations. In particular, the augmentation applicator 5 may be configured to synthesise speech audio from the block of text of voice-over-type enhancements and mix in the generated speech audio to at least partially replace the audio portion 12 of the input video 11. Thus, the audio portion 12 of input video 11 is replaced by the augmentation applicator 5 when generating the output video 14. Advantageously, this provides a mechanism via which video content can be automatically dubbed to allow input videos with speech in a source language, to be understood by an audience of another language.

To increase the quality and intelligibility of the voice-over, especially with video content that displays non-verbal cues such as speaker facial expressions and the like, it is desirable to ensure that the voice-over directly coincides with the original speech. To address this, a prosody rate of the generated speech audio is controlled by the augmentation applicator 5 so that the timing and duration of the speech audio substantially conforms with the in-point and out-point of the voice-over-type enhancement.

Synthesised voice-over speech can come in different forms, and so in one mode of operation, the augmentation editor 2 is configured to receive a user input to preview and/or select an appropriate synthetic voice-over. However, it is desirable to automatically choose an appropriate type to match the original sound of the speaker. Accordingly, the audio properties of the generated speech audio is controlled by the augmentation applicator 5 to be similar to the audio properties of a speaker detected from the audio portion 12 of the input video 11. Moreover, the augmentation applicator 5 determines the audio properties of speech occurring within the audio portion 12 of the input video 11 contemporaneous with the period defined by the in-point and out-point of a specific voice-over enhancement, and sets the audio properties of the synthesised speech audio accordingly. For example, the synthesised speech audio is specified to have a similar vocal range and timbre to that of the original speaker within the input video. Thus, in the output video 14, the speaker originating the block of text of the voice-over-type enhancement is provided with a similar synthetic voice to that of the original audio portion 12 of the input video 11.

Automated dubbing with a synthetic voice-over typically causes mismatches between the sound of the words featured in the audio, and other features of the output video 14, such as the appearance of a speaker when speaking those words. To alleviate this, voice-over-type enhancements may, in certain embodiments, comprises video alteration instructions for altering the output video in dependence on the block of text to be transcoded into speech. The video alteration instructions comprise lip-movement alteration to be made to the input video so that movement of the lips of a speaker within the output video appear to match with the synthetic speech audio. Accordingly, the augmentation applicator 5, or more generally the system 1, may comprises a voice-over-type enhancement generator that is configured to process the input video to generate voice-over-type enhancements having video alteration instructions.

For captions in particular, words are not displayed individually at the time and for the duration specified in the timecoded transcript, but rather are grouped together and displayed as blocks. However, it is desirable to automate how individual words should be grouped together, when and where they should be displayed, and for how long they should be displayed for, to achieve an optimal trade-off between various factors including the intelligibility of the resulting captions, their visibility, grammar, punctuation, and their unobtrusiveness with respect to the rest of the video content.

Accordingly, processing by the augmentation generator 3 of the timecoded transcript to generate from it each transcript-derived enhancements comprises applying a grouping process to assign a group of transcript elements to each transcript-derived enhancement 40. Naturally, the transcript elements that are grouped are sequential to one another to preserve word ordering.

The grouping process comprises assigning a first transcript element of the timecoded transcript to a first group. Subsequent transcript elements are assigned to the same group as a previous transcript element if a size of the group to which a previous transcript element is assigned does not exceed a predetermined group size threshold.

Subsequent transcript elements are assigned to subsequent groups if a time gap between subsequent and previous transcript elements, as calculated from the values of their respective temporal attributes, exceed a predetermined time gap threshold. Advantageously, this ensures augmentations such as captions are presented at a time that is better synchronised to the speech from which those augmentations are derived, and moreover reflects pauses in speech that are appropriate to the quality of performance of the speech being delivered.

Additionally, subsequent transcript elements are assigned to subsequent groups if the augmentation generator 3 determines that the size of the group to which a previous transcript element is assigned is approaching a predetermined group size threshold, and the value of the name attribute of the subsequent transcript element includes a predetermined word (such as a conjunction like "and") or a predetermined punctuation character, such as a full-stop. Advantageously, this prevents augmentations such as captions from ending on such words-which would otherwise reduce intelligibility.

The augmentation generator 3 is then configured to generate the block of text of each transcript-derived enhancement by combining the values of the name attribute of each transcript element belonging to the group assigned to that transcript-derived enhancement. Following on from this, the augmentation generator 3 applies a timing optimisation process to determine the in-point and out-point of each transcript-derived enhancement.

The augmentation generator 3 may also include other data within caption-type enhancements which further optimise the presentation of the resulting captions. Examples include line break data, text positioning data and text formatting data. When the augmentation applicator 5 processes the caption-type enhancements to provide augmentations to the output video, these other data types control caption presentation.

Line break data specifies if and where a line break occurs within the block of text when displayed. The augmentation generator 3 is configured to generate the line break data so that the position of a line break within the block of text occurs if the characters of the block of text (including spaces) exceed a predetermined length. This benefits readability of the resulting caption.

Furthermore, the augmentation generator 3 is configured to generate the line break data so that the position of a line break within the block of text preferably occurs prior to a predetermined word in the block of text (such as a conjunction like "and") if that predetermined word would otherwise be the word before the line break.

The augmentation generator 3 is also configured to generate the line break data so that the position of a line break within the block of text preferably does not occur prior to a final word in the block of text. This obviates so-called orphaned words, and instead ensures that the words of a caption are more equally distributed across multiple lines. Again, this improves the readability of a caption.

Text positioning data specifies the position of the block of text within the video frame when the caption is displayed during playback of the output video. The augmentation generator is configured to generate the text positioning data so that the block of data is positioned, by default, at a lower central region of the output video. However, in certain situations, a different position can better enhance video content, especially if captions would occlude a region important to the appreciation of the video content.

To this end, the augmentation generator further comprises a text position optimisation module that is configured to analyse the frames portion 13 of the input video 11 to recognise a predetermined set of visual entities and set the text positioning data accordingly. The predetermined set of visual entities may include, for example, other text already embedded in the input video 11, speakers, faces or other entities that are otherwise undesirable to overlay with captions.

Specifically, the text position optimisation module is configured to analyse the frames portion 13 of the input video 11 to recognise a predetermined set of visual entities and their screen occupancy over time. The text position optimisation module then processes the caption-type enhancements to make a coincidence determination about whether, during the period defined by the in-point and out-point of that caption-type enhancement, display of the associated block of text of the caption-type enhancement coincides with at least one of the recognised visual entities. The text position optimisation module can then set the text positioning data of that caption-type enhancement in response to the coincidence determination.

Setting the text positioning data of that caption-type enhancement in response to the coincidence determination can advantageously minimise occlusion of the recognised visual entity by the block of text of that caption-type enhancement, and so the video content is better enhanced.

In certain embodiments, each predetermined set of visual entities have a predetermined visibility score that defines the importance of the non-occlusion of that visual entity by blocks of text. For example, it is generally more important not to occlude pre-existing text than a speaker's face, in which case the former is assigned a higher visibility score. Thus, the text position optimisation module is configured to set the text positioning data-prioritising non-occlusion of visual entities with a higher visibility score.

Setting the position of text can also improve understanding of content, especially, for example, during a back-and-forth discussion between two or more speakers where the timing of captions cannot necessarily directly correlate to visual cues in the video content about who is speaking. In view of this, the set of predetermined visual entities ideally comprise a plurality of speakers, and the augmentation generator 3 is configured to determine which block of text originates from which of the plurality of speakers. Thereafter, utilising the text position optimisation module, the augmentation generator 3 sets the text positioning data of a block of text so that it is displayed at a position closer to the speaker from which that block of text originates, than the other of the plurality of speakers.

Sometimes it can be beneficial to superimpose text over a recognised visual entity, especially when the visual entity includes information to be translated into another language.

Accordingly, the augmentation generator 3 receives a user input to specify the translation of content of the input video 11 from a source language inherent in the input video, to a user-selected output language. As well translating transcript-derived enhancement 40 as described above, the augmentation generator 3 can also interface with the translation engine to generate enhancements that are not necessarily derived from the transcript. Rather, the augmentation generator 3 is configured to generate enhancements in response to processing the video frames portion 13 of the input video. This is particularly useful when the input video displays text or other characters for translation from a source language into an output language.

For example, the input video may feature a billboard on which text is written that is relevant to the appreciation of the content of that video. A caption-type enhancement can be generated which includes a block of text that is a translation of the text presented in the frames portion 13 of the input video. Beneficially, the caption-type enhancement can be positioned so that it is superimposed over the original text detected in the frames portion 13 of the input video 11, to allow better appreciation of the video content in a given output language.

Specifically, the augmentation descriptor is configured to:

analyse a frames portion of the input video to recognise text entities in a source language, and their screen occupancy over time;

interface with a translation engine to obtain a translation of the recognised text entities;

generate a caption-type enhancements that includes, as a block of text, the translation of the recognised text entities;

set the in-point and out-point of that caption-type enhancement to coincide with the screen occupancy of the recognise text entities; and set at least the text positioning data of that caption-type enhancement in response to a determination of the position of the recognised text entities.

Advantageously, the text positioning data of that caption-type enhancement can be set to superimpose the translated text over the recognised text entities.

Text formatting data specifies the formatting of the block of text, when displayed during playback of the output video. The augmentation generator 3 is configured to set the text formatting data in dependence on the detected visual properties of the input video. For example, the augmentation generator 3 may be configured to set the text formatting data in dependence on a frame resolution of the input video 11. The font size of the block of text may therefore be controlled in response to the resolution of the input video 11, and thus captions can occupy a predictable proportion of the screen area. Advantageously, this allows a useful balance to be achieved between readability of captions, and how much they interfere with the rest of the content of the output video 14.

As described above, the transcript from which caption-type enhancements are derived may include speaker attributes, such as a speaker identification attribute. This can be used to control formatting. Specifically, the augmentation generator is configured to set the text formatting data of a block of text in dependence on which speaker originated that block of text, so that block of texts originating from difference speakers are visually distinguishable from one another—for example, by colour.

Additionally, the speaker identification attribute can be used to control the grouping process of selecting which transcript element to assign to a specific group. Thus, when the augmentation generator applies the grouping process, this includes assigning transcript elements to different groups if the value of the speaker attribute is different.

As discussed earlier with reference to transcript-derived enhancements 40 in general, the augmentation generator 3 applies a timing optimisation process to determine the in-point and out-point of each transcript-derived enhancement 40.

Applying the timing optimisation process generally comprises deriving the in-point and/or the out-point of each transcript-derived enhancement from values of temporal attributes of transcript elements belonging to the group assigned to that transcript-derived enhancement.

In particular, the timing optimisation process comprises deriving the in-point of each transcript-derived enhancement from the value of at least one temporal attribute of a first of the group of transcript elements assigned to that transcript-derived enhancement. For example, the in-point of the first displayed caption may be set as same as the value of the timecode of the first word of the transcript 60.

The timing optimisation process also comprises setting the in-point of each transcript-derived enhancement to immediately follow the out-point of a previous transcript-derived enhancement, assuming that there isn't a pause that is long enough to merit a gap between them. For example, the in-point of the second displayed caption may be set as the out-point of the first displayed caption, the first and second caption together being part of an unbroken sentence delivered by a speaker.

The timing optimisation process may also comprise deriving the out-point of a transcript-derived enhancement from the value of at least one temporal attribute of a last of the group of transcript elements assigned to that transcript-derived enhancement. For example, the time+duration of the last word of a sentence delivered by a speaker may set the out-point of a corresponding caption.

The timing optimisation process may further comprise deriving at least one of the in-point and out-point of each transcript-derived enhancement in response to determining an optimal and/or a minimum featuring duration for that transcript-derived enhancement.

In the case that the transcript-derived enhancement 40 is a caption-type enhancement, the featuring duration may include a display duration that sets the period for which a caption persists on screen.

Other types of transcript-derived enhancements may be featured in other ways. As discussed, the in-point and out-point of synthetic voice-over-type enhancements provide instructions to control the timing and duration of voice-over speech. Accordingly, featuring duration may include the duration of the audio of the voice-over speech. Moreover, the criteria for optimising timing may be different for different types of transcript-derived enhancements.

In general, determining the optimal and/or minimum featuring duration comprises at least one of setting a predetermined upper and/or lower featuring duration threshold. For example, for caption-type enhancements, regardless of length, a minimum featuring (i.e. display) duration may be 1 second.

Furthermore, it is preferred that the timing optimisation process comprises setting the optimal and/or minimum featuring duration to be proportional to a determined size of the group of transcript elements assigned to that transcript-derived enhancement. The timing optimisation process may also comprise setting the optimal and/or minimum featuring duration to be proportional to a determined word, syllable and/or character length of the block of text of that transcript-derived enhancement. Advantageously, especially when implemented for caption-type enhancements, this allows the duration of display of resulting captions to be appropriate to the amount of time needed to read those captions. Accordingly, the accessibility of the enhancements is improved.

Another factor to consider in the control of the timing of augmentations is how they interact with changes in scene. It can be jarring for transcript-derived enhancements, such as captions, to be displayed in a way that bridges across scene transitions. Additionally, removal of a caption close to, but not aligned with a scene transition is also jarring, as is presents a double-cut in footage. To account for this, the system 10 further comprises the scene transition detector 7 to allow scene transition timecodes to be determined and utilised in controlling when augmentations are featured. In certain embodiments, the server 10 may comprise the scene transition detector 7.

Specifically, the scene transition detector is configured to process at least the frames portion 13 of the input video 11 to determine at least one scene transition timecode, corresponding to when there is a scene change. This is achieved by the scene transition detector performing a frame comparison operation to determine the at least one scene transition timecode. This may be implemented in a variety of ways, but in the present embodiment, the frame comparison operation comprises computing the difference between visual properties of consecutive frames, and determining a scene transition when the visual properties change above a predetermined limit. Visual properties include colour distribution, for example. The scene transition timecode can then be passed to the augmentation generator 3 for use in controlling timing.

Following on from this, the timing optimisation process applied by the augmentation generator comprises determining if the out-point of a transcript-derived enhancement corresponds to a timecode that is within a predetermined threshold of one of the scene transition timecodes obtained from the scene transition detector. The predetermined threshold is usually set as a value between 150 and 1000 milliseconds. Preferably, the predetermined threshold is approximately 233 milliseconds, which corresponds to 7 frames of a video running at 30 frames-per-second. If so, then the out-point of the transcript-derived enhancement is altered to be equivalent to that scene transition timecode.

This comparison and alteration may be performed during the application of the grouping process. In this case, the timing optimisation process comprises determining if the out-point derived from the value of at least one temporal attribute of the last of the group of transcript elements assigned to a respective transcript-derived enhancement corresponds to a timecode (prior to and) within a predetermined threshold of one of the at least one scene transition timecodes, and if so changing the out-point of the transcript-derived enhancement to be equivalent to that scene transition timecode.

In certain embodiments, a check is performed only to determine if the out-point of a transcript-derived enhancement corresponds to a timecode that prior to as well as within a predetermined threshold of one of the scene transition timecodes obtained from the scene transition detector.

Thus, with the appropriate parameters being set, the system 10 is capable of performing high quality and automatic addition of enhancements, such as captions. This can be used to minimise how labour-intensive it is otherwise to add these enhancements to input videos.

This is particularly useful for use-cases involving the captioning of live broadcasts. In this case, the system 1 is configured for just-in-time video content enhancement. A live television broadcaster films live video content to be broadcast to viewer a small delay (e.g. 30 seconds) after filming. During this time delay, the filmed video is continually streamed to the server 1 and processed to generate enhancements. These enhancements are added back into the output video stream so that viewer of the live broadcast can benefit from them.

Specifically, the system 10, when configured for just-in-time video content enhancement, has the input video in the form of an input video stream, and the output video is in the form of an output video stream that is transmitted a time delay after the availability of the input video stream. The augmentation generator 3 is similarly configured to generate a corresponding stream of augmentation descriptors that are combined with the input video stream to generate the output video stream.

To enable this to work as intended, the augmentation descriptors of the steam each include synchronisation data. The augmentation applicator 5 is configured to receive the stream of augmentation descriptors and synchronise them, using the synchronisation data, with the output video stream.

Specifically, the input video stream comprises timing references, including a start time that each segment of the input video stream was broadcast. These timing references are incorporated into the process applied by the augmentation generator 3 such that each augmentation descriptor includes corresponding timing references. Thus, when the input video stream and the stream of augmentation descriptors are received at the augmentation applicator 5, the augmentation applicator 5 can cross-reference the timing references to align the timing of each augmentation descriptor with the correct part of the output video stream.

The timing references may include offsets to account for timing irregularities caused by the interruptions in the stream (e.g. intermittent delays in transmission), or end user video control (e.g. pausing and restarting of playback of a video stream). Additionally, timing references may include properties such as a time that a word of speech is detected, an internal clock of a video player, and universal time.

In certain embodiments, the augmentation application 5 need not reside on the server 10, and may be implemented on a client device 8. Advantageously, and especially when that client device 8 is a live broadcaster, this means that bandwidth usage of the communication lines between the live broadcaster and the server 10 is reduced, as only the (stream of) augmentation descriptors need to be transmitted to the client device 8 rather than the output video 14 which is normally several orders of magnitude larger in data size than the augmentation descriptors. This facilitates timely delivery of augmented content, especially when it is time critical to output live broadcasts.

For live broadcasts in particular, the system may comprise a profanity filter that blanks out words that are detected (whether erroneously or otherwise) from the audio portion 12 of the input video 11, especially if generated during a pre-watershed time period. Naturally, the profanity filter can be applied to other modes of operation, for example non-live or "video-on-demand" video content.

Naturally, the system 1 also accommodates for "offline" addition of enhancements such as captions. This is not present the same pressures as live captioning, and may further benefit from user input to guide how enhancements are added. This is enabled by the augmentation editor 2 which defines a graphical user interface 20 that is typically accessed and controlled by a user operating the client device 8.

FIG. 2 is a schematic drawing of a client device 8 that implements the user interface 20 of the augmentation editor 2 of the system of FIG. 1. Specifically, the client device 8 can communicate with the augmentation editor 2 via a web browser. In alternative embodiments, the user interface 20 may be provided via an application, and this may be local to the client device 8, at least in part.

In either case, the user interface 20 is displayed on a screen 80 of the device 8. User inputs to the user interface 20 can be provided via input devices 81, such as a mouse and keyboard. User interactions specify how augmentations are generated and updated.

The user interface 20 comprises a parameters pane 21 via which parameters can be specified by the user via inputting values or selecting options using the input devices 81. Such parameters can include grouping parameters such as the predetermined group size threshold, and the predetermined time gap threshold. Parameters may also include line break parameters, such as the predetermined length of a block of text. This allows a user, via the augmentation editor 2, to preconfigure how the augmentation generator 3 is to automatically process an input video 11 to generate augmentations. Consequently, the initial form of those augmentations is dependent on the parameters that are set by the user via the parameters pane 21 of the user interface 20.

The augmentation editor 2 is then configured to receive a user command to specify an input video 11, and then issue a generation command to the augmentation generator 3 so that the augmentation generator 3 processes the input video 11 to automatically generate from it the augmentation descriptor 4. The generation command includes the parameters set by the user so that the augmentation generator 3 can is configured in line with user preferences.

When this is done, the input video 11 and the augmentation descriptor 4 are each loaded into the user interface 20 to allow the user to preview the resulting combination-which is effectively a playable output video 14—via an output video preview pane 23 of the user interface 20.

The user interface 20 presents a timeline 22 having timecodes, and a timeline position marker 22*a* showing a position of playback. Playback controls 22*b* are also provided to play, pause and skip through the video.

The augmentation editor 2 is configured to communicate with the scene transition detector 7 to obtain scene transition timecodes and display a transition marker of the scene transition at a position on the timeline 22 corresponding to the respective timecode. Alternatively, scene transition timecodes may already be embedded within the augmentation descriptor 4, the scene transition timecodes being obtained during interface between the augmentation generator 3 and the scene transition detector 7. In either case, the scene transition timecodes are made available to the augmentation editor 2 for use in displaying the transition markers.

Additionally, a visual waveform of the audio portion 12 of the input video may be distributed along the timeline 22 to provide visual cues as to when sounds are generated. These features provide visual feedback to a user, especially when the user is editing.

During editing the augmentation editor 2 is configured to update the information within the augmentation descriptor 4 as they are made. Alternatively, edits made can be written to update the augmentation descriptor 4 following editing and/or at periodic update instances.

When the augmentation descriptor 4 is read by the augmentation editor 2, it is configured to display an enhancement element 24*a*, 24*b*, 24*c* representative of respective transcript-derived enhancements from the augmentation descriptor 4. The enhancement elements 24*a*, 24*b*, 24*c* shown in FIG. 2 represent caption-type enhancements. However, other enhancement elements are possible in alternatives.

Each enhancement element 24*a*, 24*b*, 24*c* is positioned along the timeline 22 at a position corresponding to the in-points and out-points of the respective transcript-derived enhancement. Thus, each enhancement element 24*a*, 24*b*, 24*c* occupies a space on the timeline corresponding to a duration defined by the in-point and out-point of the respective transcript-derived enhancement. Specifically, each enhancement elements 24*a*, 24*b*, 24*c* comprises a timeline box a left edge of which is a starting end of the enhancement element that represents the in-point of the respective transcript-derived enhancement from which each enhancement element 24*a*, 24*b*, 24*c* is derived. The timeline box also has a right edge which is a finishing end of the enhancement element that represents the out-point of the respective transcript-derived enhancement from which each enhancement element 24*a*, 24*b*, 24*c* is derived.

The timeline 22 is horizontally-scrollable via a horizontal slider 220. Intuitively, the enhancement elements 24*a*, 24*b*, 24*c* move during scrolling to maintain their relative position to the likewise moving timecodes of the timeline 22.

Each enhancement element 24*a*, 24*b*, 24*c* is user-interactable to support at least one user interaction that updates the corresponding transcript-derived enhancement 40 thereby updating the augmentation descriptor 4.

For example, one user interaction is a movement interaction that moves the enhancement element along the timeline. The user interface 20 is configured to enable an editing user to operate the mouse of the input devices 81 to click and drag a body of the timeline box (i.e. between the left and right edges) of the relevant enhancement element left or right along the timeline 22. In response, the augmentation editor 8 updates the in-point and the out-point of the transcript-derived enhancements represented by the dragged enhancement element. However, the duration of the period represented by the in-point and out-point are preserved along with the effective width of the timeline box of the enhancement element.

Another user interaction is a resizing interaction that resizes the effective width of the timeline box of the enhancement element. In this case, an editing user operates the mouse of the input devices 81 to click and drag either one of the left and right edges of the timeline box of the relevant enhancement element left or right along the timeline. This lengthens or shortens the timeline box depending on which edge is dragged, and in which direction. In response, the augmentation editor 8 updates either of the corresponding in-point or the out-point of the transcript-derived enhancements represented by the enhancement element, so as to alter the time period represented by the in-point and out-point.

Beneficially, the augmentation editor 2 is configured to automatically update the position of one or more enhancement elements that are adjacent to an enhancement element that is receiving a movement or resizing interaction from a user. This prevents enhancements of the same type, such as captions, being displayed simultaneously and furthermore preserves the sequence in which those enhancements are displayed as well as their duration.

For example, if a first enhancement element is dragged during a movement interaction to the right so that its timeline box abuts the timeline box of the second enhancement element, then the continued dragging of the first enhancement element to the right will also shift the second enhancement element by the same amount. Furthermore, if the timeline box of the second enhancement element abuts that of a third enhancement element, then this also will move in concert with the first dragged timeline element. A similar situation occurs if the right edge of the timeline box of the first enhancement element is dragged during a resizing interaction to abut the left edge of the timeline box of the second enhancement element: the second enhancement element is shifted along the timeline. This feature, known as ripple-editing, allows for quick and convenient adjustment of multiple transcript-derived enhancements.

Each enhancement element 24a, 24b, 24c is associated with a respective complementing portion 25a, 25b, 25c that are also configured to receive user interactions to update a corresponding transcript-derived enhancement 40. Additionally, user interactions that are received at a complementing portion 25a, 25b, 25c update the corresponding enhancement element 24a, 24b, 24c, and vice-versa.

For example, each complementing portion 25a, 25b, 25c comprises a duration pane 255 which indicates the duration, in seconds, of the period defined by the in-point and out-point of the corresponding transcript-derived enhancement 40. For example, the first complementing portion 25a is associated with a first caption-type enhancement that has a period of display for its block of text of 5.54 seconds. If a resizing interaction is performed at the first enhancement element 24a to, for example move the left edge (the starting end) of the timeline box leftward, then the duration pane 255 of the first complementing portion 25a is incremented accordingly. Conversely, the duration pane of the first complementing portion 25a is user editable to specify the duration in seconds, and when so entered, the width of the timeline box of the first enhancement element 24a is altered so that value is accurately represented along the timeline.

When resizing the timeline box in response to an entered duration value, the augmentation editor 2 applies rules to determine which of the in-point and out-point to change, the rules preventing overlap of enhancements of the same type, and minimising shifting of the in-points or out-points of adjacent enhancements.

Enhancement elements and their associated complementing portions are numbered to denote their sequential ordering, with each complementing portion 25a, 25b, 25c being provided with the same number as its enhancement element 24a, 24b, 24c. This allows an editing user to quickly determine which enhancement element corresponds with which complementing portion.

Each complementing portion 25a, 25b, 25c also comprises a text pane 257, a characters-per-line pane 256, a snap-to pane 254, a split pane 253, a text position pane 252, and a deletion pane 251. The complementing portions of the enhancement elements are presented in FIG. 2 as a vertically-scrollable numbered list 25.

Similarly, each enhancement element 24a, 24b, 24c features a text pane 247 that, like the corresponding complementing portion 25a, 25b, 25c displays text corresponding to the block of text of the transcript-derived enhancement that it represents.

The text of the enhancement elements and complementing portions are user-editable via content-editing interactions. For example, an editing user can select an appropriate text pane of an enhancement element 247 and edit selected text using the input devices 81. As well as the content of text, the user can specify where a line break occurs.

Edits performed at a complementing portion are replicated at the corresponding enhancement element, and vice-versa, and moreover the augmentation descriptor 4 is updated so that the block of text of the corresponding transcript-derived enhancement is also updated. This allows an editing user to update the wording of enhancements such as captions, as defined by the augmentation descriptor 4. Consequently, the output video preview pane 23 is updated so that enhancements such as captions 23a are displayed at the correct position at the correct time.

The characters-per-line pane 256 of each complementing portion 25a, 25b, 25c displays an upper and lower number, corresponding to the number of characters of the respective upper and lower line in the block of text as shown in the text panes 247, 257. During editing of the text, these numbers are updated in real-time. Moreover, if the number of characters for a line exceed a constraint parameter, then the colour of the characters-per-line pane 256 changes in the region of the upper or lower number as appropriate. The colour changes from a default colour (e.g., black) to a first colour (e.g., orange) if the number of characters for a line exceed the constraint parameter by a small percentage, and a second colour (e.g., red) if the number of characters for a line exceed the constraint parameter by a larger percentage. In alternatives, a greater number of colours may be used, ideally chosen to indicate the extent to which the constraint parameter has been exceeded.

The user interface 20 of the augmentation editor 2 is ideally configured to issue other indications if it is determined that other properties of a transcript-derived enhancement exceed predetermined constraint parameters. For example, the constraint parameters may include the duration of a transcript-derived enhancement, as defined by its in-point and out-point. It is appropriate, for example, for caption-type enhancements to be displayed for a minimum duration, regardless of length. Thus, the constraint parameter may be exceeded if the duration of a caption-type enhancement is below this minimum predetermined duration. In alternatives, the minimum duration may be set in dependence on the number of characters in a block of text of the caption-type enhancement, with longer captions, that take longer to read, having a greater minimum duration. In either case, the duration pane 255 of the respective complementing portion 25a, 25b, 25c is highlighted via a change in colour, akin to that as described above, to indicate the extent to which the constraint parameter has been exceeded. Accordingly, a user is provided with intuitive and instant feedback if, for example, a resizing interaction of an enhancement element 24a, 24b, 24c adjusts the duration of a caption-type enhancement to be shorter than it ought to be to allow easy comprehension of a consequently displayed caption within the output video 14.

The split pane 253 of each complementing portion 25a, 25b, 25c is configured to receive a splitting interaction (e.g. via a click interaction with the split pane 253 with an input device 81). In response, the enhancement element 24a, 24b, 24c associated with the complementing portion 25a, 25b, 25c receiving the splitting interaction is split into two separate enhancement elements. Furthermore, the complementing portion 25a, 25b, 25c receiving the splitting interaction is also split into two separate complementing portions. Each of the two separate enhancement elements instantiated by the split represent one of two newly created transcript-derived enhancements that contain a respective portion of the block of text of the transcript-derived enhancement originally represented by the enhancement element before the split. Likewise, the two separate complementing portions instantiated by the split represent the same two newly created transcript-derived enhancements, and thus are associated with the respective two split-instantiated enhancement elements.

The snap-to pane 254 of each complementing portion 25a, 25b, 25c is configured to receive an interconnection interaction (e.g., via a click interaction with the snap-to pane 254 with an input device 81). In response, the enhancement element associated with the complementing portion 25a, 25b, 25c receiving the interconnection interaction is resized. Specifically, the right edge (i.e., the finishing end) of the timeline box of that enhancement element is shifted to meet the left edge (i.e., the starting end) of a subsequent enhancement element along the timeline. Furthermore, the out-point of the transcript-derived enhancement represented by the resized enhancement element is updated to be equivalent to the value of the in-point of the transcript-derived enhancement represented by the subsequent enhancement element. For caption-type enhancements, this ensures that captions can be presented directly one after the other.

In alternative configurations, the enhancement element associated with the complementing portion 25a, 25b, 25c receiving the interconnection interaction may be moved instead of resized to preserve the duration of the associated transcript-derived enhancement.

In certain embodiments, the interconnection interaction may comprise a coupling command that maintains a connection between the enhancement element and the subsequent enhancement element so that they are moveable as one unit. This simplifies altering a sequence of the transcript-derived enhancements. The interconnection interaction may also comprise a decoupling command which breaks the connection between the enhancement element and the subsequent enhancement element so that they are moveable individually.

The text position pane 252 of each complementing portion 25a, 25b, 25c is configured to receive a user interaction to specify text positioning data of the associated transcript-derived enhancement. Each text position pane 252 defines a set of regions that are user selectable to specify a corresponding set of locations within a frame bounding the output video where text of the transcript-derived enhancement is to be positioned. The set of regions are spatially arranged relative to one another to match the spatial arrangement of the set of locations. Furthermore, the selected region of the text position pane 252 is highlighted to visually distinguish it from the others of the set that are not selected. This provides a quick and intuitive way to alter the text positioning data.

For example, as shown in FIG. 2, for the text position pane 252 of each complementing portion 25a, 25b, 25c, the set of regions include a 3×3 grid of squares, with a lower middle square highlighted. This indicates that the text of the caption-type enhancement, with which the corresponding complementing portion is associated, will be positioned at a lower middle part of the frame of the output video. This is depicted in the output video preview pane 23 shown in FIG. 2. Selection of, for example, the top left square of the 3×3 grid of the text position pane 252 would instead position the corresponding caption in the upper left-hand side of the frame, and so on.

The deletion pane 251 of each complementing portion 25a, 25b, 25c is configured to receive a deletion interaction (e.g. via a click interaction with the deletion pane 251 with an input device 81). In response, the enhancement element 24a, 24b, 24c and corresponding transcript-derived enhancement associated with the complementing portion 25a, 25b, 25c receiving the deletion interaction are deleted, along with that complementing portion 25a, 25b, 25c. The transcript-derived enhancement is removed from the augmentation descriptor 4, and the respective enhancement element and complementing portion is removed from the user interface 20. Other remaining enhancement elements and complementing portions are renumbered.

Accordingly, the augmentation editor 2 provides an intuitive user interface 20 via which users can preview and edit the automatically-generated augmentation descriptor 4 prior to it being combined by the augmentation applicator 5 with the input video 11 to generate the output video 14.

The user interface 20 can also provide a way for editing users to specify which and how many different enhancements should be generated, and this in turn affects the availability of enhancements to be applied by the augmentation applicator 5.

Referring back to FIG. 1, multiple interrelated augmentation descriptors 4 may be derived from an input video 11, and consequently each may be applied by the augmentation applicator 5 either alone, or in combination with one another. For example, one augmentation descriptor 4 may be synthetic voice-over speech in one language, and another may be subtitles in a language different from the source audio speech. These may be optionally applied individually, or simultaneously by the augmentation applicator 5 under user control. To facilitate this, the augmentation applicator 5 comprises an augmentation selection interface via which an end user can select which (if any) enhancement is to be applied.

Each augmentation descriptor 4 has an identifier associated with it which identifies the type of augmentation described within it. For example, the identifier would typically identify the language of subtitle enhancements contained within it. This identifier is read by the augmentation applicator 5 and presented as an option, via the augmentation selection interface, for selection by the end user. Generally, in the case of subtitles in a variety of languages, the augmentation selection interface will allow subtitles of only one language to be selected at any one time. Nonetheless, the augmentation applicator 5 can have access to multiple augmentation descriptors 4, assuming that they have been generated from a corresponding input video 11.

Referring to FIG. 2, the augmentation editor 2 is configured to allow user selection of which of multiple interrelated augmentation descriptors 4 should be generated. In particular, the parameters pane 21 of the user interface 20 provides a selectable list of output languages that are used to control the operation of the translation engine. For each output language selected, a corresponding enhancement descriptor 4 is generated, with the translation engine translating from the source language of that transcribed from the audio portion 12 of the input video 11, to the selected target language. Advantageously, this means a user can conveniently augment an input video with captions (in the source language) and subtitles (in a chosen set of output languages).

Moreover, the parameters pane of the user interface 20 can be user-operated to generate translations after editing of an initially generated augmentation descriptor 4 in the source language. Advantageously, this allows an editing user to perfect the wording, arrangement and timing of a candidate set of caption-type enhancements in a source language before translation. This minimises duplication of workload associated with applying, for example, the same timing to enhancements of the interrelated augmentation descriptors 4 of the output languages.

Furthermore, the server 10 maintains cross-linkages that links each of the multiple interrelated augmentation descriptors 4. This is especially for those that feature a corresponding set of caption-type enhancements, the block of text of which are translations of one another. Specifically, a preferred embodiment comprises generating translations of blocks of text of each transcript-derived enhancement. The cross-linkages link each enhancement of a source augmentation descriptor (having blocks of text in the source language) with that of an interrelated output augmentation descriptor (having blocks of text in the translated output language). The server 10 can then be configured to enable editing of one augmentation descriptor to be propagated to another interrelated and cross-linked augmentation descriptor, advantageously saving editing time. This is useful when edits are made to only a few enhancements, as it obviates the need to retranslate the text of every enhancement within a source augmentation descriptor along with other adjustments.

For example, a user edit to a source augmentation descriptor may involve changing the in-point and out-point of the final caption-type enhancement. The server 10 is configured to register a change in that enhancement, and via the cross-linkages applies the same change to the in-point and out-point of the corresponding final caption-type enhancement in every interrelated augmentation descriptor.

Similarly, a user edit to a source augmentation descriptor may involve altering the wording of the block of text of the penultimate caption-type enhancement. The server 10 is configured to register a change in that enhancement, and via the cross-linkages applies corresponding changes to the corresponding penultimate caption-type enhancement in every interrelated augmentation descriptor. Moreover, the cross-linkages allow the server to determine the output language of each of the interrelated augmentation descriptors. Thus, the server 10 can operate the translation engine to translate the reworded block of text into those relevant output languages, and update the penultimate caption-type enhancement of each interrelated augmentation descriptors with the appropriate translated reworded block of text.

Beneficially, this harmonizes the wording and timing of captions and subtitles without duplication of editing operations.

Preferably, the server 10 is configured to establish a parent-child relationship between interrelated augmentation descriptors whereby edits to wording and timing flow in one direction: from parent to child, and not in the other direction. Typically, the source augmentation descriptor corresponding to a source language is designated as the parent, and the augmentation descriptors corresponding to output languages are designated as children. Accordingly, timing and wording edits made to the children are not back-propagated to the parent (or to other children). This promotes integrity and predictability of editing, especially due to the fact that the source augmentation descriptor corresponding to a source language was transcribed from the original language within the audio portion of the input video 12.

Cross-linkages are typically embodied by cross-link data elements associated with each enhancement within every augmentation descriptor. However, alternative embodiments may include a separate cross-linkage file that references corresponding enhancements across multiple interrelated augmentation descriptors.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

What is claimed is:

1. A video content enhancement system suitable for captioning of live broadcasts from a live broadcaster, the system comprising:

a server comprising an augmentation generator configured to receive and process an input video to generate an augmentation descriptor from it, the augmentation descriptor defining augmentations that enhance the content of the input video; and a client device of the live broadcaster, the client device comprising an augmentation applicator configured to generate an output video by combining the augmentations defined by the augmentation descriptor with the input video, so that playback of the output video features said augmentations;

wherein the augmentation generator is configured to:

transmit at least an audio portion of the input video to a transcript generator and receive in response from the transcript generator a timecoded transcript;

process the timecoded transcript to generate from it a set of transcript-derived enhancements, the processing comprising applying a grouping process to assign a group of sequential transcript elements to each transcript-derived enhancement; and add the set of transcript-derived enhancements to the augmentation descriptor as augmentations for enhancing the content of the input video;

and wherein each of the set of transcript-derived enhancements define:

an in-point, corresponding to a timecode when the enhancement is to be introduced during playback of the output video; and an out-point, corresponding to a timecode when the enhancement is to be removed during playback of the output video, the system being configured for just-in-time video content enhancement wherein the input video is in the form of an input video stream, and the output video is in the form of an output video stream, wherein the augmentation generator of the server is configured to receive and process the input video stream, to generate a corresponding stream of augmentation descriptors from it, the augmentation descriptors including synchronisation data, wherein the augmentation applicator of the client device is configured to receive the stream of augmentation descriptors and synchronise them, using the synchronisation data, with the output video stream the output video stream being transmitted a time delay after the availability of the input video stream.

2. The system of claim 1, wherein the set of transcript-derived enhancements comprises a block of text derived from elements of the timecoded transcript, a period of featuring augmentations derived from the block of text being defined by the in-point and the out-point of the respective enhancement.

3. The system of claim 2, wherein the timecoded transcript comprises:

a plurality of transcript elements, each of which comprises a set of values for a respective predetermined set of attributes, the predetermined set of attributes comprising:

a name attribute for identifying an individual word of speech determined to be spoken within the audio portion of the input video; and at least one temporal attribute for specifying a timing of the individual word of speech identified by the name attribute;

the at least one temporal attribute optionally comprising:

a time attribute for specifying a time at which the individual word of speech identified by the name attribute was spoken relative to a common time reference, such as a start time of the input video; and a duration attribute for specifying a duration for which the individual word of speech denoted by the name attribute was spoken;

the name attribute optionally further identifies a component of punctuation;

wherein the transcript generator may be configured to receive and process a frames portion of the input video to determine lip movements of speakers, the determined lip movements being used to improve the accuracy of a speech-to-text transcription from the audio portion of the input video;

wherein processing of the timecoded transcript to generate from it each transcript-derived enhancements may comprise at least one of:

generating the block of text of each transcript-derived enhancement by combining the values of the name attribute of each transcript element belonging to the group assigned to that transcript-derived enhancement; and applying a timing optimisation process to determine the in-point and out-point of each transcript-derived enhancement;

wherein applying the grouping process comprises at least one of:

assigning a first transcript element of the timecoded transcript to a first group;

assigning subsequent transcript elements to the same group as a previous transcript element if a size of the group to which a previous transcript element is assigned does not exceed a predetermined group size threshold; and assigning subsequent transcript elements to subsequent groups if:

a time gap between subsequent and previous transcript elements, as calculated from the values of their respective temporal attributes, exceed a predetermined time gap threshold;

the value of the name attribute of the subsequent transcript element includes a predetermined word; and/or the value of the name attribute of the previous transcript element includes a predetermined punctuation character;

wherein applying the timing optimisation process may comprise at least one of:

deriving the in-point and/or out-point of each transcript-derived enhancement from values of temporal attributes of transcript elements belonging to the group assigned to that transcript-derived enhancement;

deriving the in-point of each transcript-derived enhancement from the value of at least one temporal attribute of a first of the group of transcript elements assigned to that transcript-derived enhancement;

setting the in-point of each transcript-derived enhancement to immediately follow the out-point of a previous transcript-derived enhancement;

deriving the out-point of each transcript-derived enhancement from the value of at least one temporal attribute of a last of the group of transcript elements assigned to that transcript-derived enhancement; and deriving at least one of the in-point and out-point of each transcript-derived enhancement in response to determining an optimal and/or a minimum featuring duration for that transcript-derived enhancement; and wherein determining the optimal and/or minimum featuring duration may comprise at least one of:

setting a predetermined upper and/or lower featuring duration threshold;

setting the optimal and/or minimum featuring duration to be proportional to at least one of:

a determined size of the group of transcript elements assigned to that transcript-derived enhancement; and a determined word, syllable and/or character length of the block of text of that transcript-derived enhancement.

4. The system of claim 1, further comprising a translation engine configured to generate a translation from a source language to a user-selected output language of at least one of:

the timecoded transcript; and blocks of text of each transcript-derived enhancement.

5. The system of claim 1, wherein the transcript generator is configured to translate from a source language detected in the audio portion of the input video to a user-selected output language.

6. The system of claim 1, wherein the set of transcript-derived enhancements comprises a plurality of caption-type enhancements, each caption-type enhancement comprising a block of text derived from elements of the time-coded transcript, a period of display of the block of text being defined by the in-point and the out-point of the respective caption-type enhancement;

wherein each caption-type enhancement optionally comprises line break data for specifying if and where a line break occurs within the block of text when displayed;

the augmentation generator being configured to generate the line break data so that the position of a line break within the block of text:

occurs if the characters of the block of text exceed a predetermined length;

occurs prior to a predetermined word in the block of text (such as a conjunction like "and"); and/or does not occur prior to a final word in the block of text;

wherein each caption-type enhancement optionally comprises text positioning data for specifying the position of the block of text, when displayed during playback of the output video;

wherein the augmentation generator is optionally configured to generate the text positioning data so that the block of data is positioned, by default, at a lower central region of the output video;

wherein the augmentation generator further optionally comprises a text position optimisation module configured to:

analyse a frames portion of the input video to recognise a predetermined set of visual entities and their screen occupancy over time;

process caption-type enhancements to make a position determination about where the associated block of text of the caption-type enhancement is positioned relative to the recognised set of visual entities during the period defined by the in-point and out-point of that caption-type enhancement; and set the text positioning data of that caption-type enhancement in response to the position determination;

wherein setting the text positioning data of that caption-type enhancement in response to the position determination minimises occlusion of the recognised visual entity by the block of text of that caption-type enhancement;

wherein each predetermined set of visual entities have a predetermined visibility score that defines the importance of the non-occlusion of that visual entity by blocks of text; and setting the text positioning data priorities non-occlusion of visual entities with a higher visibility score;

wherein the predetermined visual entities comprise a plurality of speakers, and the augmentation generator is configured to:

determine which block of text originates from which of the plurality of speakers;

set the text positioning data of a block of text so that it is displayed at a position closer to the speaker from which that block of text originates, than the other of the plurality of speakers;

wherein the caption-type enhancement comprises text formatting data for specifying the formatting of the block of text, when displayed during playback of the output video;

the augmentation generator being configured to set the text formatting data in dependence on the detected visual properties of the input video;

wherein the augmentation generator is configured to set the text formatting data in dependence on a frame resolution of the input video;

wherein a predetermined set of attributes of transcript elements of the timecoded transcript comprise a speaker attribute for identifying the speaker of an individual word of speech determined to be spoken within the audio portion of the input video; and the augmentation generator is configured to set the text formatting data of a block of text in dependence on which speaker originated that block of text, so that block of texts originating from difference speakers are visually distinguishable from one another;

wherein applying the grouping process comprises assigning transcript elements to different groups if the value of the speaker attribute is different.

7. The system of claim 1, wherein the system comprises a scene transition detector configured to process the input video to determine at least one scene transition timecode, corresponding to when there is a scene change, the scene transition detector performing a frame comparison operation to determine the at least one scene transition timecode; wherein the frame comparison operation comprises computing a difference between visual properties of consecutive frames, and determining a scene transition when the visual properties change above a predetermined limit; and wherein applying the timing optimisation process comprises:

determining if the out-point derived from the value of at least one temporal attribute of the last of the group of transcript elements assigned to a respective transcript-derived enhancement corresponds to a timecode within a predetermined threshold of one of the at least one scene transition timecodes, and if so changing the out-point of the transcript-derived enhancement to be equivalent to that scene transition timecode.

8. The system of claim 1, further comprising an augmentation editor configured to edit the augmentation descriptor generated by the augmentation generator;

wherein the augmentation editor comprises a user interface to receive user input to edit the augmentation descriptor;

wherein the user interface displays, and receives user input to control:

grouping parameters such as the predetermined group size threshold, and the predetermined time gap threshold; and/or line break parameter, such as the predetermined length of a block of text;

wherein the augmentation editor is optionally configured to receive a user command to operate the augmentation generator so that the augmentation generator processes the input video to generate from it the augmentation descriptor;

wherein the augmentation editor is optionally configured to present a timeline representative of the input video;

wherein the augmentation editor is optionally configured to interface with a scene transition detector to obtain at least one scene transition timecode and display a transition marker of the scene transition at a position on the timeline corresponding to the respective timecode;

wherein the augmentation editor is optionally configured to read the augmentation descriptor and, in response, display at least one enhancement element that is representative of a respective transcript-derived enhancements from the augmentation descriptor;

wherein the at least one enhancement element is optionally positioned along the timeline at a position corresponding to the in-points and/or out-points of the respective transcript-derived enhancement;

wherein the at least one enhancement element is optionally user-interactable to support at least one user interaction that updates the corresponding transcript-derived enhancement thereby updating the augmentation descriptor;

wherein the at least one user interaction is at least one of:
a movement interaction, a resizing interaction, a split-
ting interaction, an interconnection interaction, and a
content-editing interaction;

wherein the at least one user interaction is optionally a
movement interaction that moves the at least one
enhancement element along the timeline and, in
response, updates the in-point and the out-point of the
transcript-derived enhancements represented by that
enhancement element, but preserves the duration of the
period represented by the in-point and out-point;

wherein:

each enhancement element optionally occupies a space on
the timeline delimited by a starting end and a finishing
end that are respectfully representative of the in-point
and out-point of the respective transcript-derived
enhancement; and the at least one user interaction is a resizing interaction
that shifts either the starting or finishing end of the
enhancement element along the timeline and, in
response, updates either of the corresponding in-point
or the out-point of the transcript-derived enhancements
represented by the enhancement element, so as to alter
the time period represented by the in-point and out-
point;

wherein the at least one user interaction is optionally a
splitting interaction that splits the enhancement ele-
ment into two separate enhancement elements, each
representing one of two transcript-derived enhance-
ments that contain a respective portion of the block of
text of the transcript-derived enhancement originally
represented by the enhancement element before the
split, wherein the augmentation editor is optionally configured
to automatically update the position of one or more
enhancement elements that are adjacent to an enhance-
ment element that is receiving a movement or resizing
interaction from a user to:

preserve the ordering the enhancement elements;

prevent timeline overlap of those one or more adjacent
enhancement elements; and/or preserve the size of those one or more adjacent enhance-
ment elements, and so the duration of the associated
one or more transcript-derived enhancements, wherein the at least one user interaction is optionally an
interconnection interaction that, when user-selected:

resizes a specified enhancement element by placing its
finishing end to the starting end of a subsequent
enhancement element along the timeline; and updates the out-point of the transcript-derived enhance-
ment represented by the specified enhancement ele-
ment to be substantially equivalent to the value of the
in-point of the transcript-derived enhancement repre-
sented by the subsequent enhancement element, wherein each enhancement element optionally displays
text corresponding to the block of text of the transcript-
derived enhancement that it represents, wherein the at least one user interaction is optionally a
content-editing interaction that updates at least one of:

the content of the block of text;

line break data; and text positioning data;

of the transcript-derived enhancement that the enhance-
ment element represents.

9. The system of claim 8, wherein the augmentation editor
is configured to issue an indication if it is determined that
properties of a transcript-derived enhancement exceed predetermined constraint parameters, the indication being asso-
ciated with an enhancement element representing the tran-
script-derived enhancement.

10. The system of claim 1, wherein the set of transcript-
derived enhancements comprises a voice-over-type
enhancement that includes a block of text to be transcoded
into speech, the augmentation applicator being configured to
generate speech audio from the block of text of the voice-
over-type enhancement.

11. The system of claim 10, wherein a prosody rate of the
generated speech audio is controlled by the augmentation
applicator so that the timing and duration of the speech audio
substantially conforms with the in-point and out-point of the
voice-over-type enhancement.

12. The system of claim 11, wherein audio properties of
the generated speech audio is controlled by the augmenta-
tion applicator to be similar to the audio properties of a
speaker detected from the audio portion of the input video,
the speaker originating the block of text of the voice-over-
type enhancement.

13. The system of claim 12, wherein the generated speech
audio is pitch-shifted to have a similar vocal range to that of
the original speaker within the input video.

14. The system of claim 10, wherein the voice-over-type
enhancement comprises video alteration instructions for
altering the output video in dependence on the block of text
to be transcoded into speech.

15. The system of claim 14, wherein the video alteration
instructions comprise lip-movement alteration to be made to
the input video so that movement of the lips of a speaker
within the output video appear to match with the speech
audio generated from the block of text of the voice-over-type
enhancement.

16. The system according to claim 14, further comprising
a voice-over-type enhancement generator that is configured
to process the input video to generate voice-over-type
enhancements having the video alteration instructions.

17. A method of video content enhancement suitable for
captioning of live broadcasts from a live broadcaster, the
method comprising:

processing, at a server, an input video to generate an
augmentation descriptor from it, the augmentation
descriptor defining augmentations that enhance the
content of the input video; and generating, at a client device, an output video by com-
bining the augmentations defined by the augmentation
descriptor with the input video, so that playback of the
output video features said augmentations;

wherein the processing of the input video comprises:

deriving a timecoded transcript from at least an audio
portion of the input video;

processing the timecoded transcript to generate from it a
set of transcript-derived enhancements that define an
in-point, corresponding to a timecode when the
enhancement is to be introduced during playback of the
output video, and an out-point, corresponding to a
timecode when the enhancement is to be removed
during playback of the output video;

applying a grouping process to assign a group of sequen-
tial transcript elements to each transcript-derived
enhancement; and adding the set of transcript-derived enhancements to the
augmentation descriptor as augmentations for enhanc-
ing the content of the input video, wherein the method provides just-in-time video content
enhancement wherein the input video is in the form of an input video stream, and the output video is in the form of an output video stream;

wherein the processing the input video stream, generates a corresponding stream of augmentation descriptors from it, the augmentation descriptors including synchronisation data;

wherein the stream of augmentation descriptors are synchronised, using the synchronisation data, with the output video stream, the output video stream being transmitted a time delay after the availability of the input video stream.

18. A video content enhancement system comprising:

an augmentation generator configured to receive and process an input video to generate an augmentation descriptor from it, the augmentation descriptor defining augmentations that enhance the content of the input video; and an augmentation applicator configured to generate an output video by combining the augmentations defined by the augmentation descriptor with the input video, so that playback of the output video features said augmentations;

wherein the augmentation generator is configured to:

transmit at least an audio portion of the input video to a transcript generator and receive in response from the transcript generator a timecoded transcript;

process the timecoded transcript to generate from it a set of transcript-derived enhancements; and add the set of transcript-derived enhancements to the augmentation descriptor as augmentations for enhancing the content of the input video;

and wherein each of the set of transcript-derived enhancements define:

an in-point, corresponding to a timecode when the enhancement is to be introduced during playback of the output video; and an out-point, corresponding to a timecode when the enhancement is to be removed during playback of the output video;

wherein the set of transcript-derived enhancements comprises a block of text derived from elements of the timecoded transcript, a period of featuring augmentations derived from the block of text being defined by the in-point and the out-point of the respective enhancement;

wherein the timecoded transcript comprises:

a plurality of transcript elements, each of which comprises a set of values for a respective predetermined set of attributes, the predetermined set of attributes comprising:

a name attribute for identifying an individual word of speech determined to be spoken within the audio portion of the input video; and at least one temporal attribute for specifying a timing of the individual word of speech identified by the name attribute;

wherein processing of the timecoded transcript to generate from it each transcript-derived enhancements comprises:

applying a grouping process to assign a group of sequential transcript elements to each transcript-derived enhancement;

generating the block of text of each transcript-derived enhancement by combining the values of the name attribute of each transcript element belonging to the group assigned to that transcript-derived enhancement; and applying a timing optimisation process to determine the in-point and out-point of each transcript-derived enhancement.

* * * * *